No. 788,744. PATENTED MAY 2, 1905.
J. B. WRIGHT.
SAFETY ATTACHMENT FOR CAR TRUCKS.
APPLICATION FILED JUNE 16, 1904.

2 SHEETS—SHEET 1.

Witnesses
John B. Wright, Inventor.
by
Attorneys

No. 788,744. PATENTED MAY 2, 1905.
J. B. WRIGHT.
SAFETY ATTACHMENT FOR CAR TRUCKS.
APPLICATION FILED JUNE 16, 1904.

2 SHEETS—SHEET 2.

Witnesses
E. L. Stewart
Jno. E. Parker

John B. Wright, Inventor.
by C. A. Snow & Co.
Attorneys

No. 788,744. Patented May 2, 1905.

UNITED STATES PATENT OFFICE.

JOHN B. WRIGHT, OF GREENSBORO, NORTH CAROLINA.

SAFETY ATTACHMENT FOR CAR-TRUCKS.

SPECIFICATION forming part of Letters Patent No. 788,744, dated May 2, 1905.

Application filed June 16, 1904. Serial No. 212,794.

*To all whom it may concern:*

Be it known that I, JOHN B. WRIGHT, a citizen of the United States, residing at Greensboro, in the county of Guilford and State of North Carolina, have invented a new and useful Safety Attachment for Car-Trucks, of which the following is a specification.

This invention relates to certain improvements in safety attachments for car-trucks, and has for its principal object to provide an improved means whereby on abnormal movement of the truck or car the air-brakes of the train will be instantly applied.

A further object of the invention is to provide a device of this class in which all danger of the application of the brakes will be avoided when the trucks are moving independently of the car, as in traveling around a curve, the device being intended to operate only under abnormal conditions, such as in the event of the wheels leaving the rail or the breakage of connection between the truck and the car.

A still further object of the invention is to provide a device of this class in which all danger of the leakage of air from the train-pipe by the use of valves or the like is avoided.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
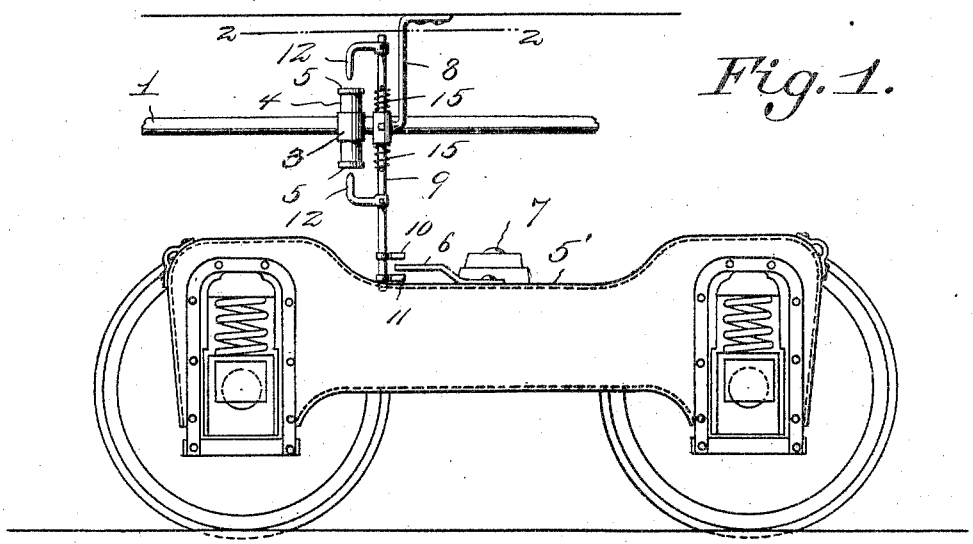
Figure 3:
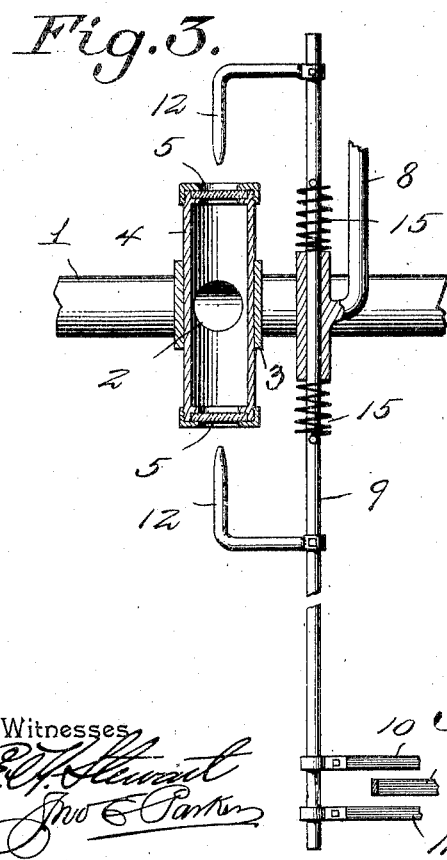
Figure 4:
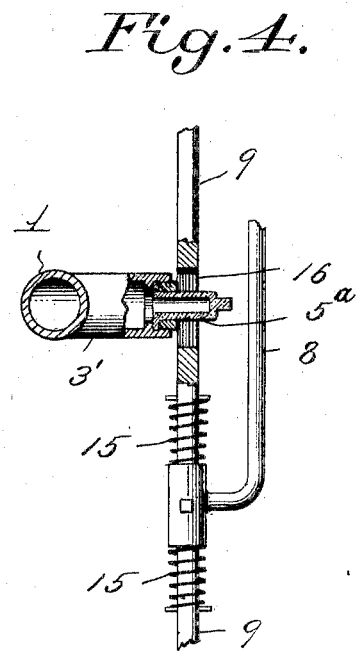
Figure 2:
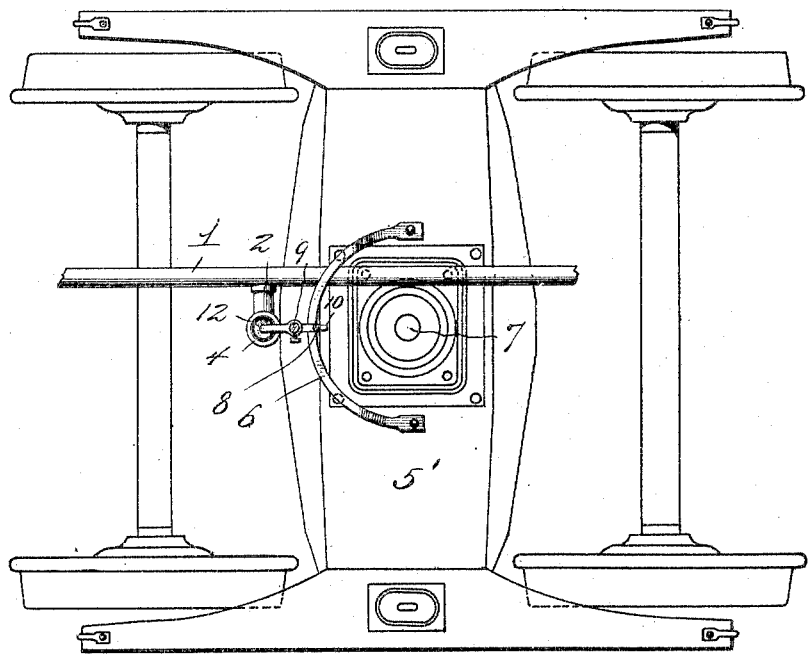
Figure 5:
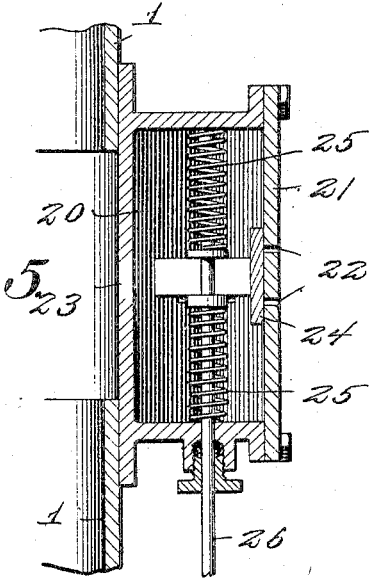
Figure 6:
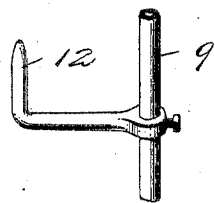
Figure 7:
Figure 7:
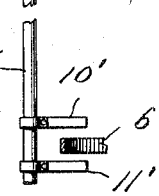

In the accompanying drawings, Figure 1 is a longitudinal sectional elevation of sufficient of a car and truck to illustrate the invention. Fig. 2 is a plan view of a portion of the same. Fig. 3 is an enlarged sectional elevation illustrating the preferred form of train-pipe closure. Fig. 4 is a similar view illustrating a slight modification of the same. Fig. 5 is a sectional elevation illustrating a still further modification. Fig. 6 is a detail perspective view of one of the breaking-fingers. Fig. 7 is a detail view of one of the adjustable arms for engaging the truck-carried member of the apparatus.

Similar numerals of reference are employed to indicate corresponding parts throughout the several figures of the drawings.

In truck-actuated safety devices hitherto employed it has been found that there is danger of the operation of the safety device during the travel of the train around curves owing to the fact that the trucks in going around the curve assume different angular positions with relation to the longitudinal line of the car, and a further disadvantage is found in that where auxiliary-valve mechanism is employed in the train-pipe to be operated by the safety device there is always more or less danger of leakage of the air through the valve and the consequent application of the brakes through reduction in train-pipe pressure.

In carrying out the present invention the train-pipe 1 is provided with a branch pipe 2, that is connected to a T 3, and to the ends of the T are coupled short pipe-sections 4, the ends of which are closed by caps 5, formed of glass, hard rubber, or any other frangible imporous material, these caps being hermetically sealed in the ends of the tube-sections, so as to positively prevent accidental leakage of air from the train-pipe.

To a bolster or bar 5' of the truck are secured arcuate bars 6, said bars being arranged on curved lines struck from the vertical center of the king-bolt or center pin 7 of the truck. The car is provided with a hanger 8, forming a guide for a vertically-movable bar 9, said bar having a pair of horizontally-disposed arms 10 11 arranged one above and one below the arcuate bar 6, but at a sufficient distance therefrom to permit of considerable range of movement of the car and truck without coming into contact. The vertical bar 9 carries a pair of fingers 12, arranged in alinement with the frangible caps 5, but normally out of contact therewith.

Should there be any abnormal movement of the car or the truck, the arcuate bar 6 and one or other of the arms 10 11 will be brought into contact and impart either an upward or a downward movement to the vertical bar 9, bringing one or other of the fingers 12 into engagement with the frangible caps, breaking one or other of the caps and allowing the air to escape from the train-pipe. This will immediately apply the brakes in the same manner as though the reduction in pressure had been accomplished by the engineer's brake-valve or by the conductor's valve.

By the employment of the arcuate bars arranged on curved lines struck from the center of the king-pin the trucks will be free to move independently of the cars, as in traveling around curves, without any danger of accidental application of the brakes.

The bar 9 is supported in any suitable manner and held by friction or otherwise, but preferably is centered by means of a pair of springs 15, the springs yielding when movement is imparted to the bar.

As a modification of the invention the bar 9 may be provided with an elongated slot 16 and the train-pipe provided with a tube 3', having a frangible projection 5$^a$, adapted to enter the slot 16, but normally is out of contact with the upper and lower walls of said slot. In this case any abnormal movement will result in contact between one of the end walls of the slot and the cap 5', the latter being broken to permit the escape of air from the train-pipe.

As a still further modification of the invention the train-pipe is provided at one side with a valve-chamber 20, having a cap 21, provided with perforations 22, as shown in Fig. 5. This valve-chamber is in communication with the train-pipe through an opening 23, and in the valve-chamber is a small valve 24, normally held in the central position and closing both of the perforations 22 by means of springs 25. The stem 26 of the valve is continued down in the form of an arm 9$^a$, having horizontally-extending fingers or arms 10' 11', arranged, respectively, above and below the arcuate bar 6.

In the operation of the last modification contact between the bar 6 and either of the horizontal arms will result in movement of the valve to effect opening of one or other of the perforations 22, and thus permit the escape of air and the reduction of pressure in the train-pipe.

It is obvious that the arms and fingers secured to the vertically-disposed rod 9 may be adjustable and held in place by set-screws or similar securing devices, as shown, for instance, in Figs. 6 and 7.

Having thus described the invention, what is claimed is—

1. In a safety device for car-brakes, the combination with a train-pipe, of a train-pipe-opening member, and an arcuate bar carried by the car-truck and adapted to engage and operate said member.

2. In combination with a train-pipe and means for opening the same, of an arcuate operating-bar arranged on a curved line struck from the king-pin of the truck and adapted to engage said operating member.

3. In a device of the class specified, a train-pipe having a frangible section, and means operable on independent vertical movement of the truck in either direction for breaking the same.

4. In a device of the class specified, a train-pipe having a frangible section, a yieldably-mounted rod, means carried thereby for breaking such frangible section, and means operable by independent movement of the truck for imparting movement to said rod.

5. The combination with a train-pipe, of a tube extending therefrom and provided with upper and lower frangible caps, a vertically-movable member for engaging and breaking said caps, and means carried by the truck for engaging said member.

In testimony that I claim the foregoing as my own I have hereto affixed my signature in the presence of two witnesses.

JOHN B. WRIGHT.

Witnesses:
EMORY H. BOGLEY,
C. E. DOYLE.